(12) United States Patent
Adams (10) Patent No.: US 9,738,211 B2
(45) Date of Patent: *Aug. 22, 2017

(54) CARGO DUNNAGE DEVICE

(71) Applicant: Fontaine Engineered Products, Inc., Jasper, AL (US)

(72) Inventor: James H. Adams, Jasper, AL (US)

(73) Assignee: Fontaine Engineered Products, Inc., Jasper, AL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/085,252

(22) Filed: Mar. 30, 2016

(65) Prior Publication Data

US 2016/0207442 A1 Jul. 21, 2016

Related U.S. Application Data

(62) Division of application No. 14/184,512, filed on Feb. 19, 2014, now Pat. No. 9,327,634.

(60) Provisional application No. 61/766,630, filed on Feb. 19, 2013.

(51) Int. Cl.
*B60P 7/08* (2006.01)
*B60P 7/12* (2006.01)
*B60P 7/15* (2006.01)

(52) U.S. Cl.
CPC ............ *B60P 7/0892* (2013.01); *B60P 7/12* (2013.01); *B60P 7/15* (2013.01)

(58) Field of Classification Search
CPC ............ B60P 7/12; B60P 7/15; B60P 7/0892

USPC ........ 410/30, 36, 39, 40, 49, 50, 87, 90, 91, 410/94, 120, 121, 154, 155; 206/453, 206/593, 586; 188/32
See application file for complete search history.

(56) References Cited

U.S. PATENT DOCUMENTS

| | | | |
|---|---|---|---|
| 2,992,704 A * | 7/1961 | Showker | B64F 1/16 410/30 |
| 3,197,236 A * | 7/1965 | Burton | B60P 7/12 410/49 |
| 3,557,909 A | 1/1971 | Neumann | |
| 3,630,487 A | 12/1971 | Wechter, Jr. | |
| 3,774,364 A | 11/1973 | Johnson | |
| 4,020,769 A | 5/1977 | Keir | |
| 4,066,289 A * | 1/1978 | Gargour | B60P 3/06 410/30 |
| 4,138,950 A | 2/1979 | Mooney et al. | |
| 4,310,271 A | 1/1982 | Canellis et al. | |
| 5,927,915 A | 7/1999 | Grove, Sr. | |
| 6,439,543 B1 | 8/2002 | Peckham | |
| 6,726,416 B2 * | 4/2004 | Shoup | B65D 19/06 410/31 |
| 7,070,374 B2 | 7/2006 | Womack et al. | |
| 7,571,953 B2 | 8/2009 | Adams | |
| 8,057,143 B2 | 11/2011 | Adams | |
| 8,491,239 B2 * | 7/2013 | Ferrari | B60P 7/12 410/30 |

(Continued)

*Primary Examiner* — Stephen Gordon
(74) *Attorney, Agent, or Firm* — Andrus Intellectual Property Law, LLP (57) ABSTRACT

A system for transporting cargo includes a cargo deck and a dunnage device for securing a load to the cargo deck. The dunnage device includes an elongated tubular body having an interior space. A transverse wall is positioned within the interior space of the tubular body. The elongated tubular body is adapted to be positioned on the cargo deck.

18 Claims, 8 Drawing Sheets

(56) References Cited

U.S. PATENT DOCUMENTS

| | | |
|---|---|---|
| 9,327,634 B2 * | 5/2016 | Adams .................. B60P 7/12 410/49 |
| 2006/0071506 A1 | 4/2006 | Adams |
| 2012/0099941 A1 | 4/2012 | Larsh et al. |
| 2014/0161555 A1 | 6/2014 | Adams |

* cited by examiner

CARGO DUNNAGE DEVICE

CROSS REFERENCE TO RELATED APPLICATIONS

This application is a divisional of U.S. patent application Ser. No. 14/184,512, filed Feb. 19, 2014, now U.S. Pat. No. 9,327,634, issued May 3, 2016, which claims priority to U.S. Provisional Patent Application No. 61/766,630, filed Feb. 19, 2013, the contents of which are hereby incorporated by reference.

FIELD OF THE INVENTION

The present invention relates generally to cargo transportation systems, vehicles and/or devices and, more specifically, to a cargo dunnage device for cargo transportation systems, vehicles and/or devices.

DETAILED DESCRIPTION OF EMBODIMENTS

Figure 1:
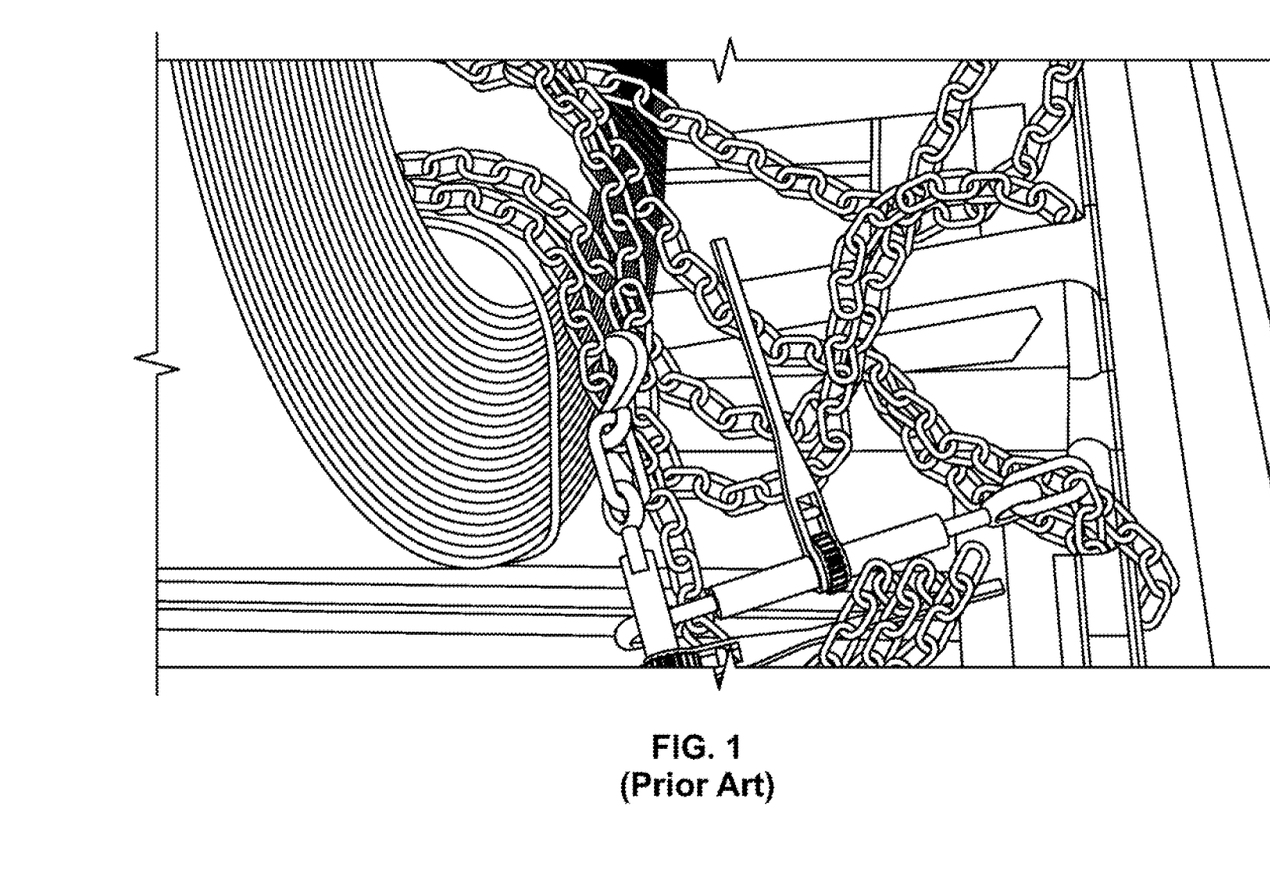
FIG. 1 is a perspective view of a prior art wood cargo dunnage system.

As illustrated in FIG. 1, cargo is typically supported and secured on the cargo deck of a trailer, intermodal flat rack or other cargo transport device by wooden dunnage and chains or straps. Such an approach is often time consuming and, if not done properly, may result in the cargo becoming unsecured during transport. In addition, such an arrangement requires several different parts or components that may become lost or must be stored.

Figure 2:
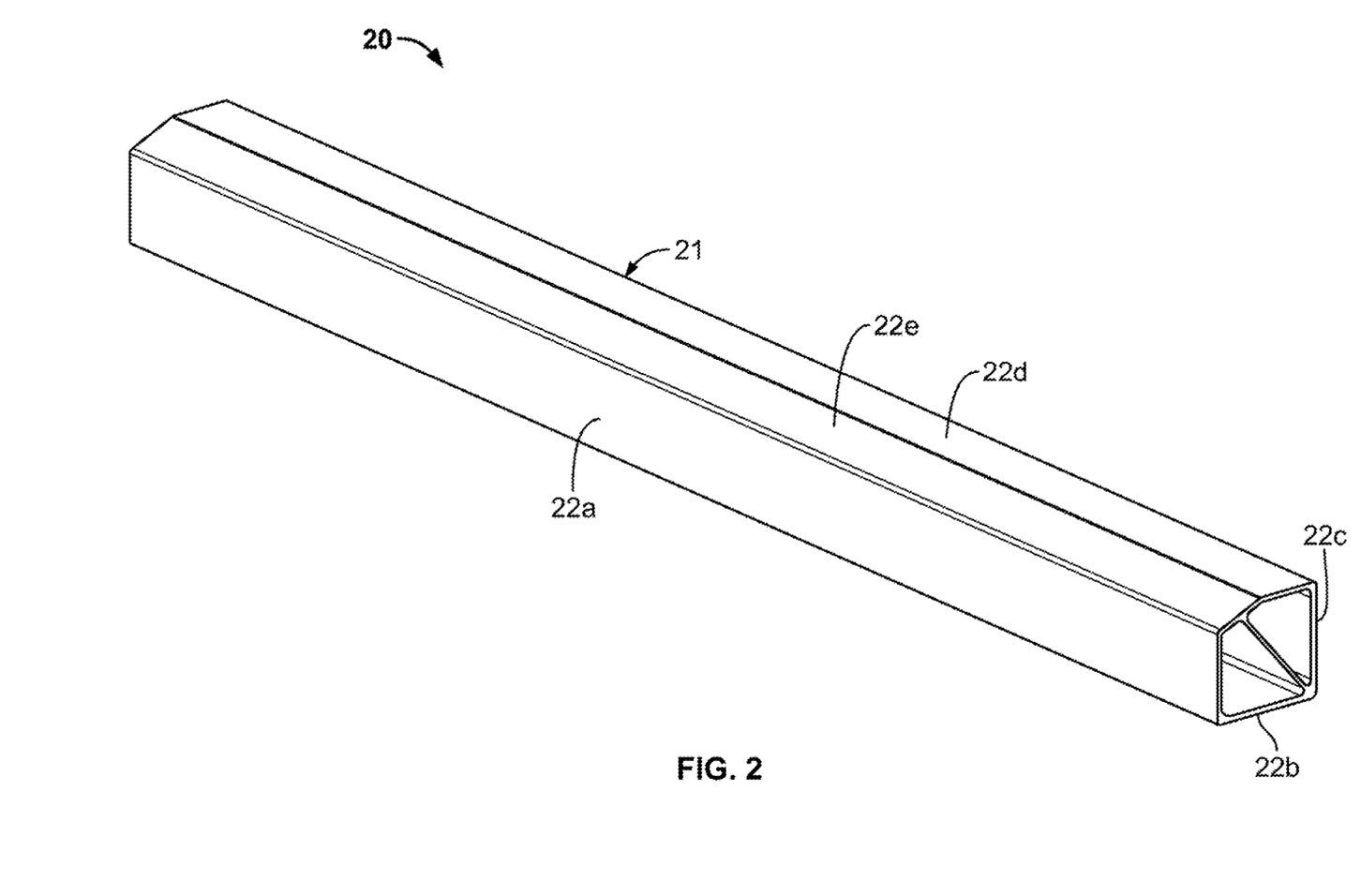
FIG. 2 is a perspective views of an embodiment of the cargo dunnage device of the present invention.
Figure 3:
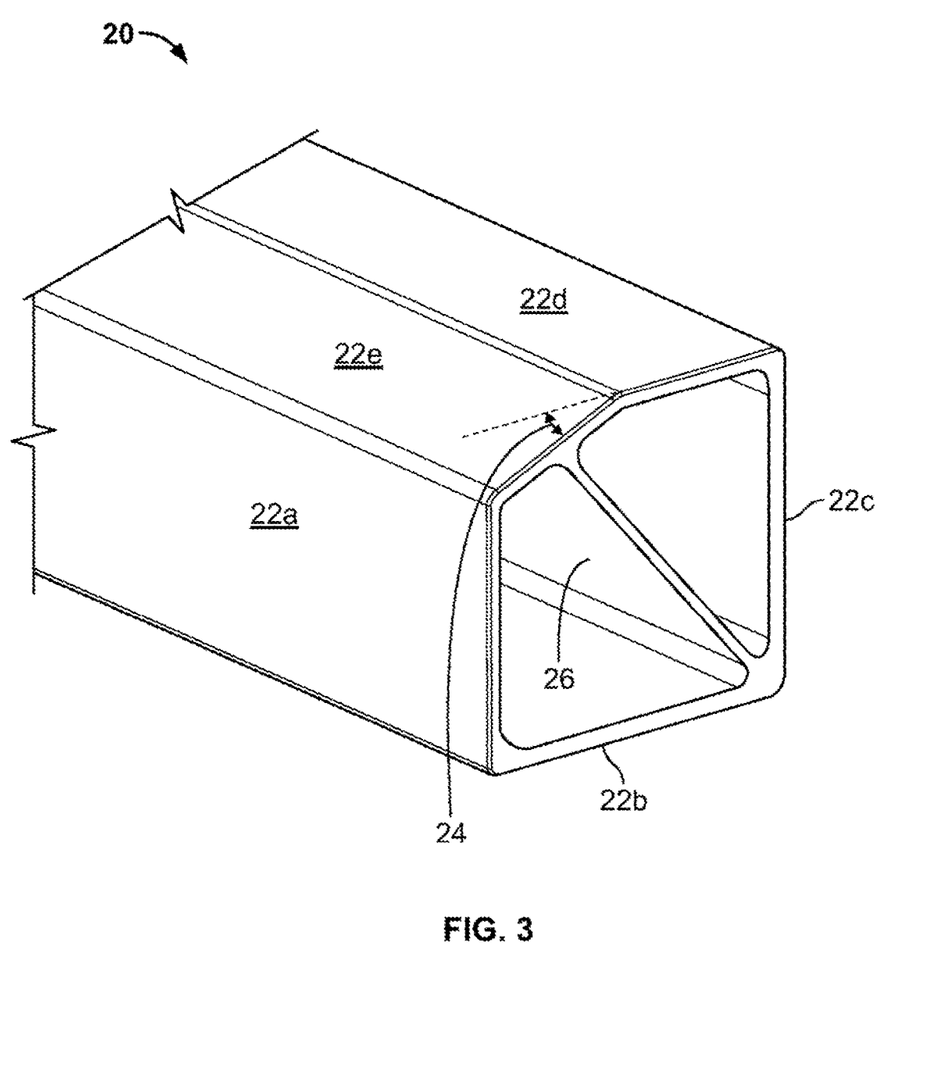
FIG. 3 is an enlarged partial perspective view of an end portion of the cargo dunnage device of FIG. 2.

An embodiment of the cargo dunnage device of the present invention is indicated in general at 20 in FIGS. 2 and 3. As illustrated in FIGS. 2 and 3, the dunnage device preferably features an elongated tubular body, indicated in general at 21 in FIG. 2, having five side walls 22a-22e. As illustrated in FIG. 3, first side wall 22e preferably forms a non-perpendicular angle with second side wall 22d (indicated by arrows 24), for example, an angle of approximately twenty seven degrees (to match a standard coil radius). Of course alternative angles may be used for angle 24. The dunnage device features a tubular construction so that an interior space is formed. Transverse wall 26 is positioned within the interior space and increases the strength or crush resistance of the dunnage device. Here, the first side wall 22e is a load-engagement side wall, and a first end of the transverse wall 26 is attached to the load-engagement side wall 22e. The tubular body 21 also includes a base wall 22b configured to rest on the cargo deck.

The dunnage device 20 of FIGS. 2 and 3 may be substituted for traditional timber dunnage devices in cargo carrying and securement applications (see FIG. 1, for example) and may be 50% lighter than oak timbers that are currently in use. As explained below, the dunnage devices 20 may be locked onto a rack on the main beam of the cargo deck when not in use and may be stronger, lighter, re-usable and consistent.

The dunnage device is preferably made from aluminum or metal to provide a weight savings over timber dunnage devices. Other materials, such as plastics, composites or any other material that is strong and durable and rigid or semi-rigid may be used. The dunnage device is preferably covered with polyurea or other material to eliminate the need for a friction mat. The dunnage device may feature an extruded construction. Alternatively, welding may be used to attach at least some of the sides and walls together. Other methods of attaching the sides and walls together may also be used.

Figure 4:
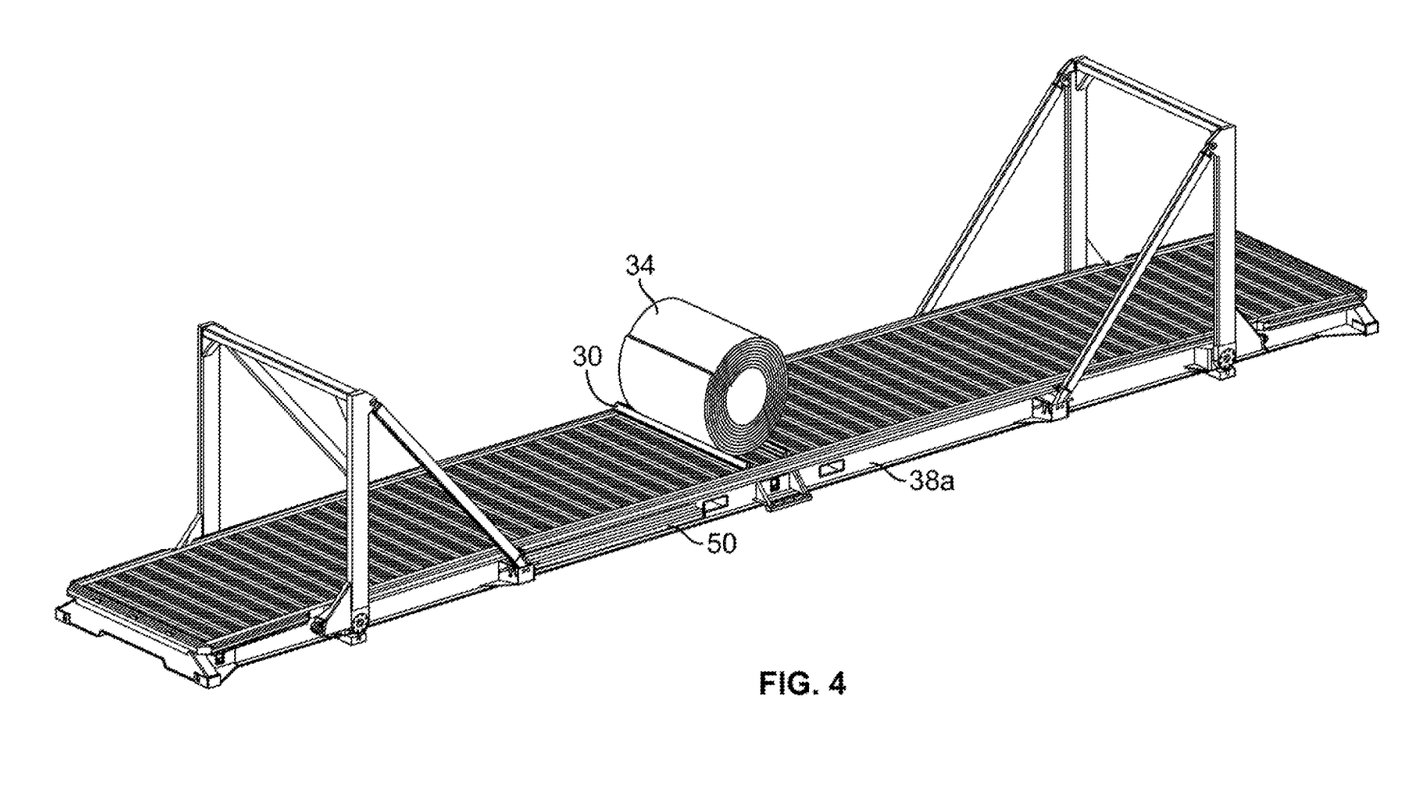
FIG. 4 is a perspective view of an embodiment of the cargo dunnage device of the present invention in use on an intermodal flat rack.
Figure 5:
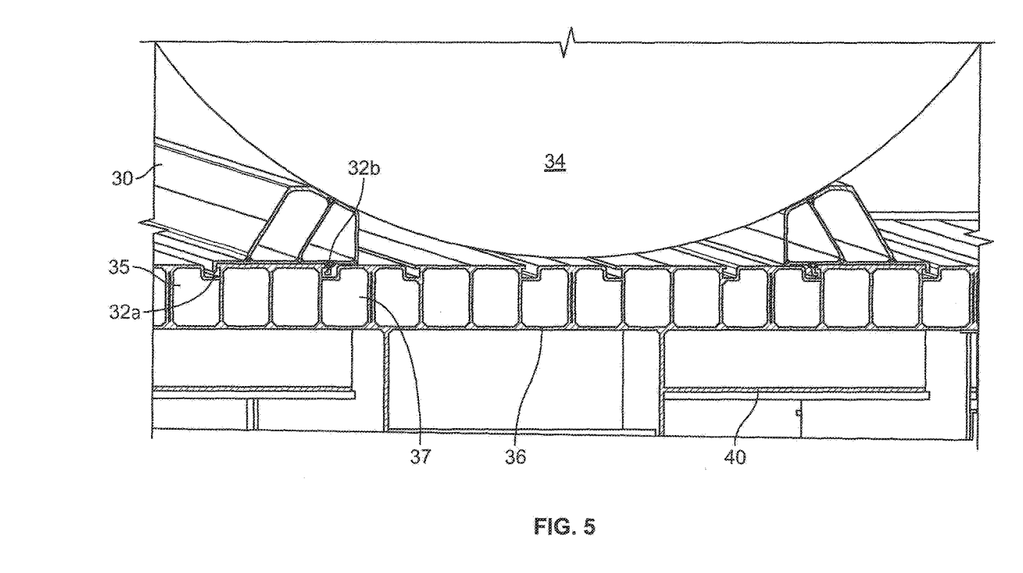
FIG. 5 is an enlarged cross-sectional view of a portion of the cargo deck and dunnage device of FIG. 4.
Figure 6:
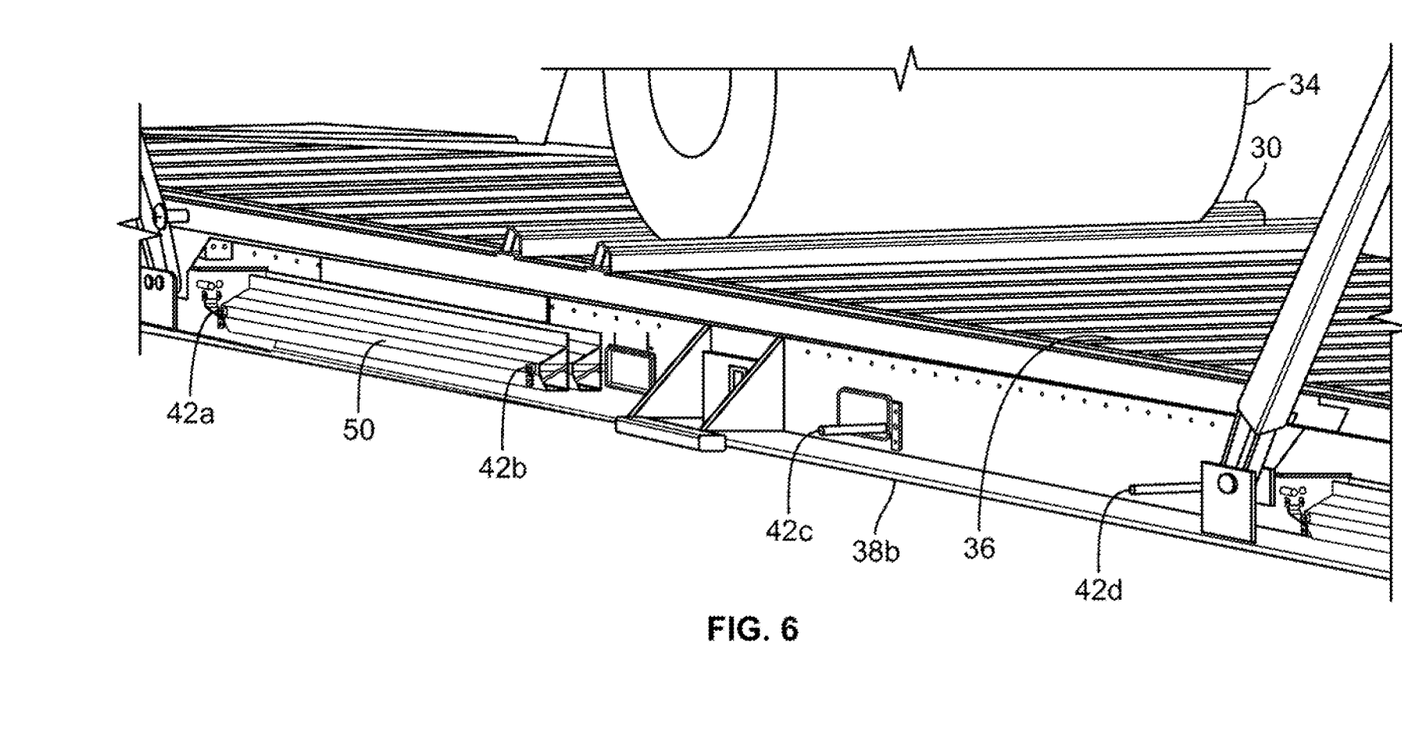
FIG. 6 is a partial perspective view of an embodiment of the cargo dunnage device of the present invention being stored on an intermodal flat rack when not in use.

An alternative embodiment of the cargo dunnage device is illustrated at 30 in FIGS. 4-6. As illustrated in FIG. 5, the dunnage device 30 features downward extending and generally vertical hook portion 32a and downward extending generally vertical and inward extending generally horizontal hook portion 32b. The dunnage device 30 being used to secure a load, such as a roll of material 34, to a cargo deck 36 is illustrated in FIGS. 4-6. As an example only, the cargo deck may be that of a trailer or an intermodal flat rack, such as the one illustrated in FIG. 4, which is the subject of commonly assigned U.S. patent application Ser. No. 14/076,725, the contents of which are hereby incorporated by reference.

As illustrated in FIGS. 4-6, the cargo deck 36 may feature a pair of main beams 38a and 38b which are joined by a number of cross beams, such as cross beam 40. The main beams and cross beams are preferably constructed from steel, although aluminum may be used for some of the beams as a lighter alternative. As best shown in FIG. 5, the cargo deck 36 is made up of a number of hollow plank members that are preferably aluminum and joined or formed in a side-by-side configuration to form a unitary aluminum construction, such as that of the REVOLUTION flatbed trailer from the Fontaine Trailer Company of Haleyville, Ala. The cargo deck is preferably of the type having channels for receiving sliding load securing brackets, as illustrated in commonly assigned U.S. Pat. Nos. 7,571,953 and 8,057,143, the contents of which are hereby incorporated by reference. As illustrated in FIG. 5, the inward-facing hook portions 32a and 32b of the dunnage devices 30 engage the channels 35 and 37 of the cargo deck 36.

As a result, by properly positioning dunnage devices 30 on both sides of load 34, the load may be secured to the cargo deck 36.

Figure 7:
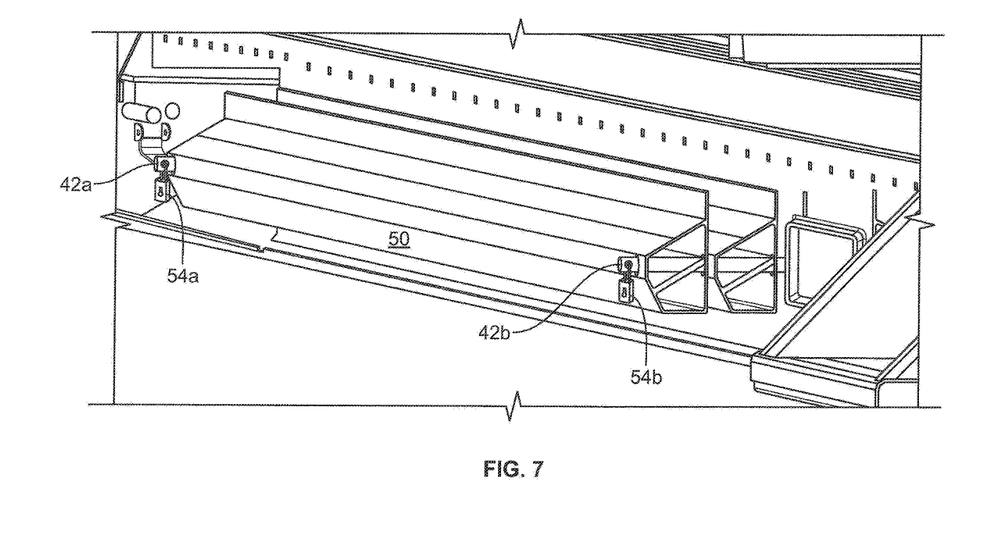
FIG. 7 is an enlarged partial perspective view of the cargo dunnage device and the intermodal flat rack of FIG. 6.

As illustrated in FIG. 6, rods 42a-42d are preferably attached to main beam 38b to provide storage for dunnage devices, such as the third embodiment indicated at 50 in FIGS. 4, 6 and 7, when the dunnage devices are not in use. More specifically, as illustrated in FIG. 7, the dunnage devices 50 each have openings sized to receive the rods 42a-42d. As illustrated in FIG. 7, apertures are formed on the end of the rods (as illustrated for rods 42a and 42b) so that the dunnage devices 50 may be locked in the storage position by conventional locks 54a and 54b. Of course alternative types of locks known in the art may be used.

Figure 8:
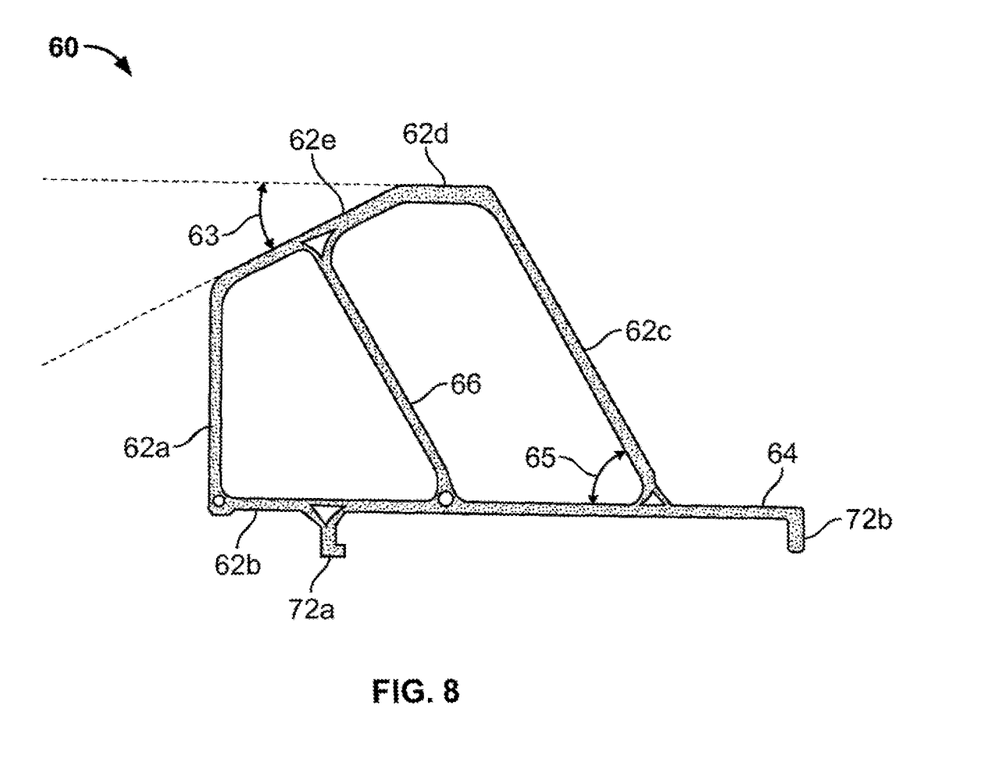
FIG. 8 is a side elevational view of an embodiment of the cargo dunnage device of the present invention.

An embodiment of the dunnage device of the present invention is indicated in general at 60 in FIG. 8. As illustrated in FIG. 8, the dunnage device has an elongated body that features five side walls 62a-62e. As illustrated in FIG. 8, a first side wall 62e preferably forms a non-perpendicular angle with a second side wall 62d (indicated by arrows 63), for example, an angle of approximately twenty seven degrees (to match a standard coil radius). In addition, side wall 62c forms an angle with base wall 62b (indicated by arrows 65) that may also be approximately twenty seven degrees. The base wall 62b is configured to rest on the cargo deck (see FIG. 5). Base wall 62b also includes a flange portion 64. The dunnage device 60 features a tubular construction so that an interior space is formed. Transverse wall 66 is positioned within the interior space and increases the strength or crush resistance of the dunnage device 60. Transverse wall 66 is generally parallel with side wall 62c, as illustrated in FIG. 8. The transverse wall 66 is attached between two of the five side walls 62a-62e. Here, the first side wall 62e is a load-engagement side wall, and a first, upper end of the transverse wall 66 is attached to the load-engagement side wall 62e.

As also illustrated in FIG. 8, the dunnage device 60 features downward and inward extending hook portion 72a and downward extending hook portion 72b. The hook portions 72a, 72b extend downward from the base wall 62b. At least one of the hook portions 72b extends downward from the flange portion 64. At least one of the hook portions 72a includes a generally vertical portion extending downward from the base wall 62b and a generally horizontal portion extending from the generally vertical portion. As a result, dunnage device 60 may be used to engage the floor of a cargo deck in a manner similar to that illustrated for dunnage device 30 in FIGS. 4-6 so as to secure a load, such as a roll of material 34, to the cargo deck 36.

While the preferred embodiments of the invention have been shown and described, it will be apparent to those skilled in the art that changes and modifications may be made therein without departing from the spirit of the invention, the scope of which is defined by the following claims.

What is claimed is:

1. A system for transporting cargo, the system comprising:
    a cargo deck; and
    a dunnage device including:
        an elongated tubular body having an interior space, the tubular body being coupled to the cargo deck; and
        a transverse wall positioned within the interior space of the tubular body and elongated in a direction of elongation of the tubular body;
    wherein the tubular body includes a load-engagement side wall and a base wall that rests on the cargo deck, the load-engagement side wall and the base wall being situated generally opposite one another;
    wherein a first, upper end of the transverse wall abuts the load-engagement side wall and a second, lower end of the transverse wall abuts the base wall; and
    wherein the cargo deck includes a pair of channels, and the dunnage device further includes a pair of hook portions extending downward from the tubular body and engaged with the pair of channels of the cargo deck.

2. The system of claim 1, wherein the tubular body includes three side walls in addition to the load-engagement side wall and the base wall that together with the load-engagement side wall and the base wall define the interior space.

3. The system of claim 2, wherein the load-engagement side wall forms a non-perpendicular angle with at least one of the three additional side walls.

4. The system of claim 3, wherein the load-engagement side wall forms an angle of approximately twenty seven degrees with the at least one of the three additional side walls.

5. The system of claim 1, wherein the pair of hook portions extend downward from the base wall.

6. The system of claim 5, wherein at least one of the hook portions includes a generally vertical portion extending downward from the base wall and a generally horizontal portion extending from the generally vertical portion.

7. The system of claim 6, wherein the base wall includes a flange portion that extends away from the tubular body, and wherein at least one of the hook portions extends downward from the flange portion.

8. The system of claim 1, wherein the tubular body includes a side wall in addition to the load-engagement side wall and the base wall, and wherein the additional side wall and the transverse wall are generally parallel to one another.

9. The system of claim 8, wherein the additional side wall and the transverse wall each form an angle of approximately twenty seven degrees with the base wall.

10. The system of claim 1, wherein the transverse wall is welded within the interior space of the tubular body.

11. The system of claim 10, wherein the tubular body includes at least two side walls in addition to the load-engagement side wall and the base wall; and wherein the load-engagement side wall, the at least two additional side walls, and the base wall are welded to one another.

12. The system of claim 1, wherein the tubular body is extruded.

13. The system of claim 1, wherein the tubular body is coated with polyurea.

14. A system for transporting cargo, the system comprising:
    a cargo deck; and
    a dunnage device including:
        an elongated tubular body having an interior space, the tubular body being coupled to the cargo deck; and
        a transverse wall positioned within the interior space of the tubular body;
    wherein the cargo deck includes a pair of channels, and the dunnage device further includes a pair of hook portions extending downward from the tubular body and engaged with the pair of channels of the cargo deck;
    wherein the tubular body includes a base wall that rests on the cargo deck, and wherein the pair of hook portions extend downward from the base wall;
    wherein at least one of the hook portions includes a generally vertical portion extending downward from the base wall and a generally horizontal portion extending from the generally vertical portion; and
    wherein the base wall includes a flange portion that extends away from the tubular body, and wherein at least one of the hook portions extends downward from the flange portion.

15. The system of claim 14, wherein the tubular body includes a load-engagement side wall that is non-parallel to the base wall.

16. The system of claim 15, wherein the transverse wall has a first, upper end that abuts the load-engagement side wall and a second, lower end that abuts the base wall.

17. A system for transporting cargo, the system comprising:
    a cargo deck; and
    a dunnage device including:

an elongated tubular body having an interior space, the tubular body being coupled to the cargo deck; and a transverse wall positioned within the interior space of the tubular body;

wherein the tubular body includes a side wall, and wherein the side wall and the transverse wall are generally parallel to one another; and wherein the tubular body includes a base wall that rests on the cargo deck, and wherein the side wall and the transverse wall each form an angle of approximately twenty seven degrees with the base wall.

18. The system of claim 17, wherein the cargo deck includes a pair of channels, and the dunnage device further includes a pair of hook portions extending downward from the base wall and engaged with the pair of channels of the cargo deck.

* * * * *